United States Patent Office 3,342,200
Patented Sept. 19, 1967

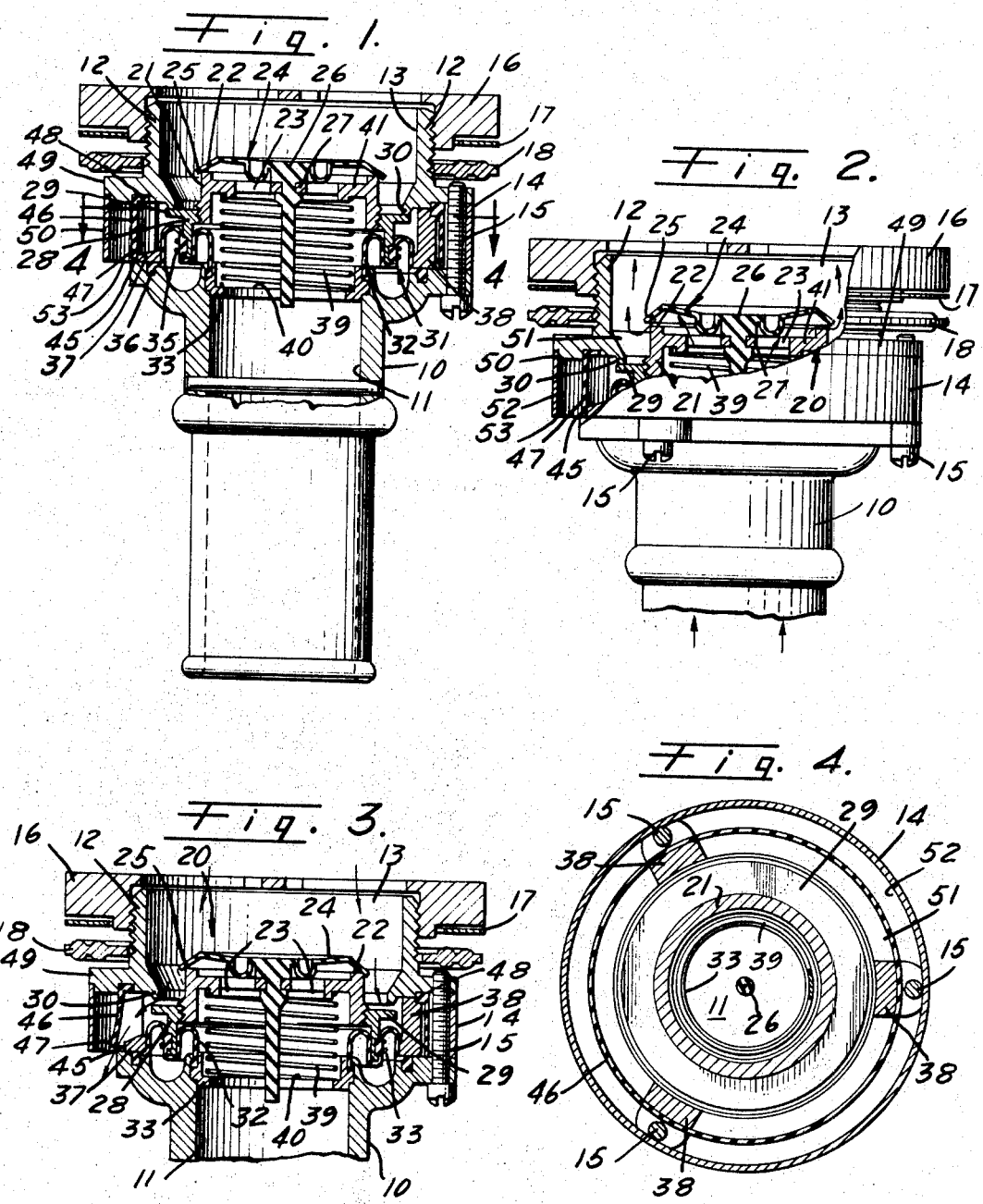

3,342,200
OXYGEN MASK EXHALATION CHECK VALVE
Orland W. Wilcox, Sierra Madre, Calif., assignor to Sierra Engineering Co., Sierra Madre, Calif., a corporation of California
Filed Mar. 12, 1965, Ser. No. 439,298
3 Claims. (Cl. 137—102)

ABSTRACT OF THE DISCLOSURE

A breathing valve for use in a pressurized oxygen breathing system at high altitudes, including a floating valve assembly incorporating both an inhale valve and an exhale valve, an exhaust passageway surrounding the floating valve assembly and with which the exhale valve communicates, and a resilient cylindrical check valve member normally closing the exhaust passageway to preclude the inhalation of ambient air which might otherwise occur under certain abnormal conditions, one end of the check valve member being radially expansible for opening the exhaust passageway.

---

The invention relates to valve devices used on breathing masks and especially those worn by fliers of airplanes which ascend to relatively high altitudes. More particularly, the invention has reference to that portion of the breathing valve which may be identified as an exhalation check valve which serves as a safety feature.

The usual breathing valve which is applied to the mask of a crewman contains a floating valve assembly, there being an inflow check valve on the assembly and an outflow exhaust valve which opeart alternately.

The valve housing in which all of the operating parts are assembled is normally affixed to the mask and has a flexible oxygen supply line connected to it. When all operations are functioning normally, the inflow check valve yields to a differential pressure when the crewman inhales at which time the exhalation valve closes. When the crewman exhales, the inflow check valve closes and the floating valve assembly moves to open the exhalation valve. Good design suggest that the area of the valve assembly be as large as conveniently possible so as to minimize the required exhalation pressure exerted by the crewman in order to open the exhalation valve.

When trouble occurs, it is on those occasions where, for example, there might be a pull upon the supply hose causing a reduction in pressure in the supply line as compared to pressure on the mask side. Even though the crewman may not be exhaling, this will cause the exhalation valve to open inadvertently to ambient air. If, when such a condition occurs, the ambient air is at extremely low pressure as it would be at high altitude the crewman upon the next inhalation cycle will inhale ambient air at low pressure and with a minimum of oxygen content. It might readily be that the crewman will take several breaths under conditions such as these without realizing that the exhalation valve has ben inadvertently opened and may possibly lose consciousness before realizing the difficulty.

It is, therefore, among the objects of the invention to provide a new and improved exhalation check valve for an oxygen mask which will guard against the possibility of inhalation of ambient air through the check valve opening.

Another object of the invention is to provide a new and improved exhalation check valve in a position of cooperation with a normal oxygen breathing valve containing both an inflow check and an exhalation valve, the exhalation check valve being of such design and construction that all of the advantages normally inherent in the breathing valve are retained.

Still another object of the invention is to provide a new and improved exhalation check valve to serve as a safety valve guarding against the prospect of a crewman breathing rarified ambient air through the exhalation passage wherein the safety feature incorporated in the exhalation check valve is positive in its action, which operates as a result of a minimum amount of effort on the part of the crewman and which is also so simple in construction and installation as to add relatively little to the overall cost of the valve device.

Still another object of the invention is to provide a new and improved exhalation check valve which serves as a safety check to prevent inadvertent inhalation of ambient air on unwanted occasions, the exhalation check being of ample area, therefore requiring relatively little effort to open to full capacity so that the crew man can exhale with perfect ease but which operates promptly and positively on all occasions so that normal breathing is assured under unexpected adverse circumstances.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a longitudinal sectional view of a breathing valve of the type attached to the breathing mask of a crewman showing valve elements all in closed position.

FIGURE 2 is a side longitudinal view partially broken away showing the valve elements in the condition existing during inhalation.

FIGURE 3 is a fragmentary longitudinal sectional view showing the condition of the valve elements during normal exhalation.

FIGURE 4 is cross-sectional view on the line 4—4 of FIGURE 1.

In an embodiment of the invention chosen for the purpose of illustration there are shown sundry housing elements including a base sleeve 10 through which extends a supply passageway 11, and to the exterior of which is normally attached a supply hose (not shown). A second sleeve 12 has a mask service passageway 13 extending therethrough. The sleeve 12 is separated from the base sleeve 10 by a shroud 14, the parts being secured together by means of bolts 15. A nut 16 is made use of in attaching the device to a mask (not shown) with the aid of a cap bearing washer 17 and a sealing washer 18. Within the housing at the area immediately within the shroud 14 is a floating valve assembly indicated generally by the reference character 20. The floating valve assembly 20 includes a sleeve-like element 21 on the upper exterior edge of which is an inflow valve seat 22. Passages 23 through the sleeve-like element provide communication between the inflow valve seat and the supply passageway 11. A flapper valve indicated generally by the reference character 24 has a perimetral skirt 25 which seats upon the inflow valve seat 22. A boss 26 at the center of the flapper valve provides means for attaching the flapper valve to a central section 27 of the sleeve-like element 21.

An annular plate 28 is threadedly secured to the exterior of the sleeve-like element 21, the annular plate providing a flange 29 which serves as an exhaust valve element. The exhaust valve element embodied in the flange 29 seats upon an annular exhaust valve seat 30 which is part of the sleeve 12.

An annular flexible somewhat composite sealing connection 31 serves to connect the floating valve assembly 20 to the housing. The sealing conection consists of an inner annular flexible ring portion 32 anchored to the base sleeve 10 by use of a retainer ring 33. Another flexible ring section 34, actually a continuation of the ring section 32 is fastened to the annular plate 28 by means of a retainer spring 35 and has its outer end embedded in an anchor groove 36 in which it is held by portions 37 and 38 of the shroud 14. A relatively large coil spring 39 bears against a shoulder 40 of the ring 33 at the lower end and against a flange 41 of the sleve-like element 21 at the upper end. The spring 39 serves normally to extend the floating valve assembly 20 upwardly so that the exhaust valve element 29 is seated upon the seat 30.

The shroud 14 and in particular the portions 37 and 38 thereof act together to form an annular cylindrical outwardly facing valve seat area 45. Cooperating with this outwardly facing valve seat area 45 is a relatively flexible substantially cylindrical valve element 46 having a free end 47 thereof normally seated upon the outwardly facing valve seat area 45 and another end 48 anchored in an extension 49 of the sleeve 12. A protecting skirt 50, which is actually part of the shroud 14, overlies the cylindrical valve element 46.

In operation with the supply of oxygen normally turned on and properly regulated, oxygen will be available in the supply passageway 11. When the crewman inhales there will be a relative negative pressure in the mask service passageway 13 and oxygen will unseat the flapper valve 24 (FIG. 2) and flow into the service passageway 13. Upon exhaling, the flapper valve closes and the floating valve assembly 20 moves downwardly as shown in FIGURE 3. This unseats the exhalation valve from the exhalation valve seat 30 and exhalation gases pass through the exhalation passage 51 to the exhalation valve seat 30 and then through an outflow passage 52 from which the gases flow outwardly because of unseating the flexible valve element 46 from the outwardly facing valve seat area 45. The gases thence pass the annular opening 53 to the exterior.

Upon inhalation, the floating valve assembly 20 is lifted upwardly by pressure of the spring 39 and the exhalation valve element closed upon the exhalation valve seat 30. At the same time, the valve element 46 falls closed upon the outwardly facing valve seat area 45 and in this way the exhalation check valve is closed. Thereafter, even if there should be an inadvertent popping open of the exhalation valve from the seat 30, the crewman will be unable to breath in ambient air because passage will be blocked by the seating of the valve element 46 on the valve seat area 45.

Other circumstances which might give rise to this condition is failure to turn on the oxygen regulator. Under such a condition low pressure beneath the flapper valve might cause the floating valve assembly to pop open. Breathing of ambient air under such circumstances is, of course, guarded against by the same action of the valve element 46 already described. These precautions at the same time continue to make possible employment of the relatively large area of the floating valve assembly against which the crewman breathes. Moreover, sealed in the manner disclosed, the prospect of operation of the valve being interfered with by an accumulation of moisture is also minimized.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A composite inhalation-exhalation valve device comprising a valve body having a passage therethrough and a supply connection thereon, a tubular assembly within said passage movable axially relative to the passage, said body comprising a spacer having an exhalation port therein, a mask end element and a hose supply end element releasably joined to respective ends of said spacer, said mask end element having an annular exhaust valve seat thereon forming an exhaust port, an annular exhaust valve element on said tubular assembly movable to seated and unseated positions relative to said exhaust valve seat, an annular flexible connection between said tubular assembly and said supply end element, resilient means acting between said body and said tubular assembly normally urging said exhaust valve element to seated position, an inhalation check valve passage through said tubular assembly communicating between the supply end element and the mask end element, an inhalation check valve seat surrounding the mask end of said passage, an inhalation check valve element operably mounted on said inhalation check valve seat, an annular outwardly facing exhalation valve seat in said spacer encompassing said exhaust port and located downstream relative to said exhaust port, an annular flexible curtain valve element surrounding said exhalation valve seat, said curtain valve element having one annular end secured to said spacer on a side thereof opposite said exhalation valve seat, said curtain valve element having an axial width spanning the distance between said one end and said exhalation valve seat, another free end of said curtain valve element being normally in releasable engagement with said exhalation valve seat whereby to inhibit flow of ambient air inwardly through said exhaust port when said exhalation valve element is inadvertently opened; said annular curtain valve element being radially expansible to permit the exhausting of breathed air therethrough, and a skirt attached to said spacer in a position spaced radially outwardly from said curtain valve element, said skirt forming an opening exterior to and downstream of said exhalation port, whereby to overlie said curtain valve in protecting relationship.

2. A valve device as claimed in claim 1 wherein the radial distance between the curtain valve element when in seated position and the skirt is less than the axial width of said curtain valve element whereby to limit opening movement of adjacent parts of said curtain valve element to a swing less than 90°.

3. A valve device as claimed in claim 2 wherein said skirt is of relatively stiff inflexible character and annular in form and wherein said opening is in a substantially straight line alignment with said exhalation port and said exhaust port.

References Cited

UNITED STATES PATENTS

| 2,051,023 | 8/1936 | Bullard | 137—382 X |
| 2,715,980 | 8/1955 | Frick | 137—525 X |
| 2,954,793 | 10/1960 | Seeler | 137—512.2 |
| 3,088,477 | 5/1963 | Bloom | 137—512.2 |
| 3,228,409 | 1/1966 | Godel | 137—494 |

FOREIGN PATENTS 776,474  11/1934  France.

WILLIAM F. O'DEA, *Primary Examiner.*

R. GERARD, *Examiner.*